(12) United States Patent
Scholten et al.

(10) Patent No.: US 6,245,281 B1
(45) Date of Patent: Jun. 12, 2001

(54) USE OF A NYLON-12 FOR SELECTIVE LASER SINTERING

(75) Inventors: Heinz Scholten, Haltern; Wolfgang Christoph, Marl, both of (DE)

(73) Assignee: Huels Aktiengesellschaft, Marl (DE)

( * ) Notice: Subject to any disclaimer, the term of this patent is extended or adjusted under 35 U.S.C. 154(b) by 0 days.

(21) Appl. No.: 09/179,671

(22) Filed: Oct. 27, 1998

(30) Foreign Application Priority Data

Oct. 27, 1997 (DE) .............................................. 197 47 309

(51) Int. Cl.⁷ .................................................... B29C 67/04
(52) U.S. Cl. ........................... 264/497; 264/460; 264/125
(58) Field of Search ..................... 264/497, 122, 264/125, 308, 460; 528/323, 310; 523/201, 205, 206; 525/902

(56) References Cited

U.S. PATENT DOCUMENTS

| | | | |
|---|---|---|---|
| 4,334,056 | * 6/1982 | Meyer et al. | 528/496 |
| 5,304,329 | 4/1994 | Dickens, Jr. et al. | 264/25 |
| 5,342,919 | 8/1994 | Dickens, Jr. et al. | 528/323 |
| 5,527,877 | * 6/1996 | Dickens, Jr. et al. | 264/497 |
| 5,648,450 | 7/1997 | Dickens, Jr. et al. | 264/122 |

FOREIGN PATENT DOCUMENTS

| | | |
|---|---|---|
| 29 06 647 | 4/1980 | (DE) . |
| 44 21 454 | 12/1995 | (DE) . |
| WO 96/06881 | 3/1996 | (WO) . |

OTHER PUBLICATIONS

E. Schmachtenberg, et al., Kunststoffe, vol. 87, No. 6, pp. 773, 774 and 776, "Laser–Sintering Of Polyamide", Jun. 1997.

Derwent Abstract, AN 92–121077, JP 04 067912, Mar. 3, 1992.

Gianna Cojazzi, et al., Macromolecular Chemistry and Physics, vol. 192, No. 1, 4 pages, "Phase Transitions in Nylons 8, 10 and 12 Crystallized From Solutions", Jan. 1991.

* cited by examiner

Primary Examiner—Angela Ortiz
(74) Attorney, Agent, or Firm—Oblon, Spivak, McClelland, Maier & Neustadt, P.C.

(57) ABSTRACT

A process for producing shaped articles are prepared by a process comprising selectively laser sintering a nylon-12 pulverulent material having the following characteristics:

| | |
|---|---|
| Melting point | 185–189° C. |
| Enthalpy of fusion | 112 ± 17 J/g |
| Solidification point | 138–143° C. |

4 Claims, No Drawings

USE OF A NYLON-12 FOR SELECTIVE LASER SINTERING

BACKGROUND OF THE INVENTION

Field of the Invention

The present invention relates to a process for producing shaped articles by selective laser sintering of pulverulent materials, in which a nylon-12 (polylaurolactam; PA 12), having certain physical characteristics, is used as the pulverulent material.

DESCRIPTION OF THE BACKGROUND

In the development of machinery and apparatus, the production of samples, models and prototypes of the machinery and apparatus plays an important part in their development and has an influence on the development time. The production of such shaped articles is, however, time-consuming in its own right, which is another factor which influences the development time. In recent times, a process has become known which is termed selective laser sintering (or rapid prototyping) and which permits rapid and low-cost manufacture of such shaped articles from a pulverulent material, generally from a polymer powder. The process is the next step after a computer-aided design (CAD), which gives sectioned images of the desired shaped article in digitalized form.

In order to produce a shaped article, the polymer powder is applied in a thin layer onto a table, which is capable of being moved downward, in a sintering chamber which has been heated to a temperature slightly below the melting point of the polymer. The layer thickness is selected so that a melt layer is produced after the subsequent laser sintering. The laser sinters the powder particles together as controlled by the computer. After this step, the table is lowered by an amount corresponding to the layer thickness, usually from 0.2–2 mm. The procedure is repeated by applying a fresh layer of powder. After the preselected number of cycles has been completed, a block has been produced with the intended number of layers and consisting on the outside of powder, which hides an interior consisting of a highly viscous melt in the shape of the desired shaped article. Unmelted regions, in which the powder is still present in solid form, stabilize the shape of the melt.

The block, consisting of powder shell and melt, is then slowly cooled, and the melt solidifies as the temperature drops below the solidification point of the polymer. It is advantageous here if the block is held at the solidification point until the phase change is completed. This is achieved by selecting a low cooling rate in the temperature range of the phase change, so that the liberated heat of solidification holds the shaped article precisely at the solidification point in the interior of the block until the phase change is completed. After cooling, the block is removed from the sintering chamber, and the shaped article is separated from the unsintered polymer powder. The powder can be reused for the process.

The requirements for maximum suitability of a polymer for laser sintering are:

(i) A very high difference between melting point and solidification point. Since in pure polymer powders the solidification point is determined by basic physical data, an increase of the melting point by forming a new crystal modification implies a great advantage. The larger the difference, the smaller is the shrinkage on solidification and the more precise is the achievement of the desired dimensions of the shaped article. A lowering of the solidification point by means of additives or comonomers generally has an adverse effect on the mechanical properties.

(ii) A very high enthalpy of fusion. A very high enthalpy prevents powder particles located in the neighborhood of the particles affected by the laser beam from beginning to melt as a result of unavoidable conduction of heat, which results in sintering outside the desired area.

The pulverulent polymer most frequently employed is nylon-11 (PA 11). Other polymers which can be used include nylons, polyacetals, polypropylene, polyethylene and ionomers. Polycarbonates and polystyrene have also been used. The suitability of the polymer powders is a function of physical characteristics, as well as of their chemical nature. WO 95/11006 describes a polymer powder which is suitable for laser sintering and which, when its melting behavior is determined by differential scanning calorimetry (DSC) at a scanning rate of 10–20° C./min, shows no overlap of the melting peak and the solidification peak and which has a degree of crystallinity of from 10–90%, also determined by DSC, a number-average molecular weight Mn of from 30,000–500,000 and a polydispersity index of Mw/Mn in the range from 1–5. According to WO 96/04335, this powder is used together with a reinforcing powder whose melting point is considerably higher than that of the polymer, for example, glass powder.

Summary Of The Invention

Accordingly, one object of the present invention is to provide a pulverulent polymer material of improved laser sintering properties.

Briefly, this object and other objects of the present invention as hereinafter will become more readily apparent can be attained by a process for producing shaped articles, which comprises:

selectively laser sintering a nylon-12 pulverulent material having the following characteristics:

| | |
|---|---|
| Melting point | 185–189° C. |
| Enthalpy of fusion | 112 ± 17 J/g |
| Solidification point | 138–143° C. |

DETAILED DESCRIPTION OF THE PREFERRED EMBODIMENTS

A preferred nylon-12 of the invention has the following characteristics:

| | |
|---|---|
| Melting point | 186–188° C. |
| Enthalpy of fusion | 100–125 J/g |
| Solidification point | 140–142° C. |

The various characteristics of the pulverulent polymer material used in the present invention were determined by means of DSC according to DIN 53765 and AN-SEMICONDUCTOR 0663. The measurements were carried out using a Perkin Elmer DSC 7, with nitrogen as the gas for flushing the apparatus and a heating rate and cooling rate of, respectively, 20° K/min. The temperature measurement range employed ranged from −30 to 210° C.

The specific PA 12 powder of the invention has advantages in laser sintering which powders of the prior art do not have, or have to only a small extent. Surprisingly, this applies both to conventional PA 12 and to PA 11 which is widely used as a powder for selective laser sintering. For these polyamides and also for PA12 grades of the invention, the following data relevant for laser sintering were measured:

| Polyamide | Melting point | Enthalpy of fusion | Solidification point |
|---|---|---|---|
| PA 12[1] | 187 ± 1° C. | 112 ± 17 J/g | 141 ± 1° C. |
| PA 12[2] | 177 ± 1° C. | 71 ± 11 J/g | 141 ± 1° C. |
| PA 12[3] | 176 ± 1° C. | 109 ± 16 J/g | 143 ± 1° C. |
| PA 11[4] | 186 ± 1° C. | 87 ± 13 J/g | 157 ± 1° C. |

[1]PA 12 of the invention.
[2]VESTAMID ® from Hüls AG (polymerized hydrolytically).
[3]ORGASOL ® from Elf Atochem S.A. (polymerized in solution).
[4]RILSAN ® from Elf Atochem S.A. (polymerized hydrolytically).

The data in the table show that the PA 12 of the invention exhibits the most favorable combination of the largest possible difference between melting and solidification points and also the largest possible enthalpy of fusion. This means that the temperature in the sintering chamber can be held at a higher level than is the case with commercially available polyamides. The result is that the shrinkage on solidification (curl) is lower and the dimensional stability of the shaped articles is higher than when these other polyamides are used.

Shaped articles prepared from the powder of the invention have such a good surface that they do not require post-treatment for many applications. In addition, the dimensional stability of the shaped articles is better than that of shaped articles made from other polyamides. The relatively steep melting peak allows the temperature in the form to be held without difficulty at just below the melting point. This means that there is no need to introduce excessive amounts of energy via the laser and, even under these conditions, there is no likelihood of caking of particles in the zones not covered by the laser beam. The powder in these zones is, therefore, better suited for reuse than conventional PA 12 or PA 11 powder. Because its melting point is higher, the liquid product after melting of the PA 12 powder of the invention is markedly less viscous than a melt of conventional PA 12 at a temperature exceeding its melting point by the same extent. The shaped articles have relatively few pores, as evidenced by the fact that their density is only slightly below the density of shaped articles produced conventionally (i.e. by injection molding, extrusion, or the like). The strength of the shaped articles is correspondingly high. PA 12 is very tough, and shaped articles of the material can, therefore, be subjected to high stresses. The water absorption of PA 12 is moreover very low, and the shaped articles do not, therefore, tend to swell when contacted with water.

The PA 12 powder employed in the process of the invention is known per se and is expediently prepared by the process of DE 29 06 647 B1, by dissolving PA 12 in ethanol and allowing it to crystallize out under particular conditions, giving a powder having particle sizes in the μm range.

The process of the invention has no special features with regard to the other properties of the PA 12 material or the process conditions for selective laser sintering. The mean particle size and the particle size distribution determine, inter alia, the surface area tolerances, which are always larger than the mean particle diameter. The PA 12 powders generally have mean particle sizes of from 50–150 μm. If desired, the particles of the PA 12 obtained as described above are further comminuted by grinding and then graded to meet requirements.

The characteristics of the process, such as layer thickness, temperature in the form, strength of the laser radiation, distance of the layer from the radiation source, irradiation time and cycle frequency, may easily be determined for a given shaped article by exploratory experiments.

German priority application serial number 197 47 309.1 having the filing date of Oct. 27, 1997 is hereby incorporated by reference into the present application.

Obviously, numerous modifications and variations of the present invention are possible in light of the above teachings. It is, therefore, to be understood that within the scope of the appended claims, the invention may be practiced otherwise than as specifically described herein.

What is claimed as a new and is intended to be secured by letters patent is:

1. A process for producing shaped articles, which comprises:

selectively laser sintering a nylon-12 material having the following characteristics:

| | |
|---|---|
| Melting point | 185–189° C. |
| Enthalpy of fusion | 112 ± 17 J/g |
| Solidification point | 138–143° C. |

2. The process as claimed in claim 1, wherein the nylon-12 has the following characteristics:

| | |
|---|---|
| Melting point | 186–188° C. |
| Enthalpy of fusion | 100–125 J/g |
| Solidification point | 140–142° C. |

3. The process as claimed in claim 1, wherein the particles of said pulverulent nylon-12 range in particle size from 50–150 μm.

4. The process as claimed in claim 1, wherein the shaped articles produced exhibit a dimensional stability which is greater than that of shaped articles produced from other polyamides.

* * * * *